Aug. 11, 1959 W. C. PARKMAN 2,898,749
UNIVERSAL JOINT ADJUSTING MEANS
Filed Oct. 18, 1957
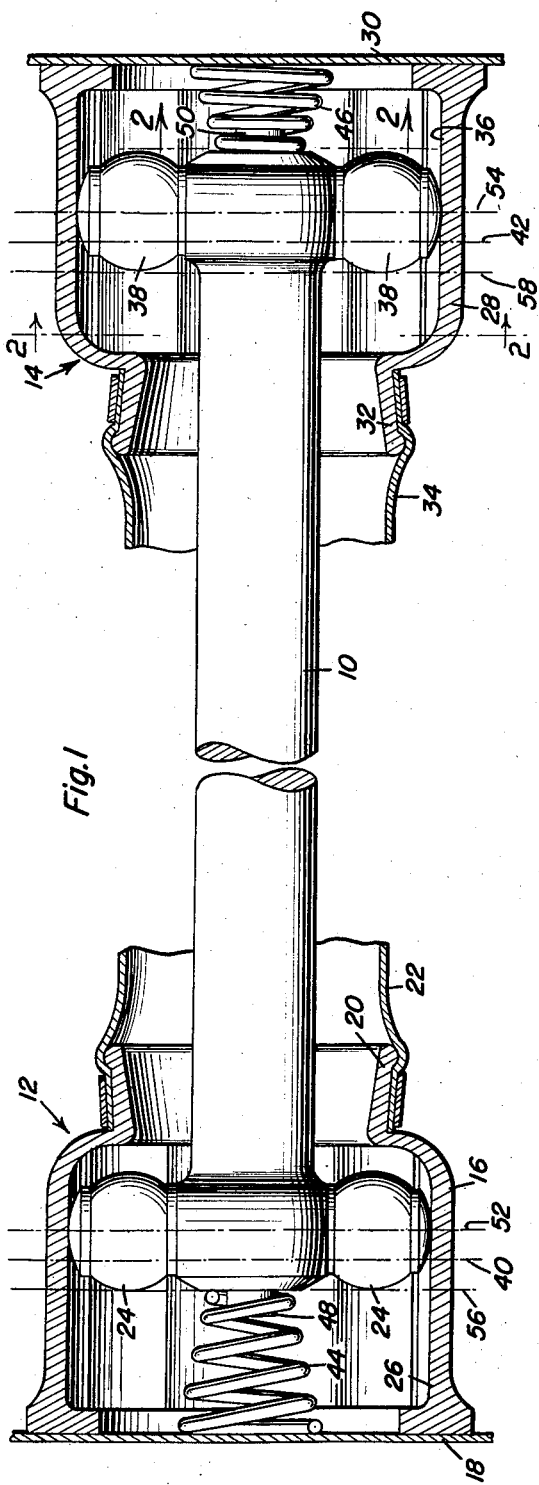
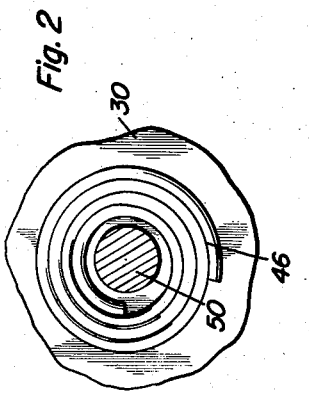
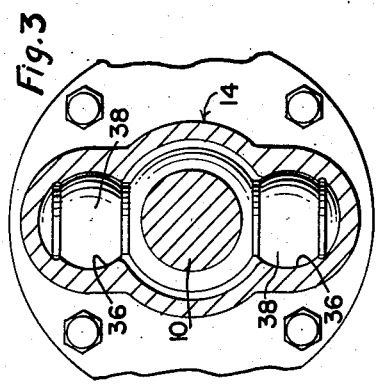
William C. Parkman
INVENTOR.

United States Patent Office 2,898,749
Patented Aug. 11, 1959

2,898,749
UNIVERSAL JOINT ADJUSTING MEANS
William C. Parkman, Lakeland, Fla.
Application October 18, 1957, Serial No. 691,021
6 Claims. (Cl. 64—8)

This invention relates in general to new and useful improvements in repair devices for automotive equipment, and more specifically to universal joint adjusting means.

There is presently in use on many makes of automobile drive shafts having universal joints at the opposite ends thereof which are of the so-called Detroit type. These universal joints each include a housing and trunnion bearings, the housing encasing the trunnion bearings which are in turn carried by the associated end of the drive shaft. Each of the housings has an interior surface which is engaged by the trunnion bearings and functions as a bearing surface. The trunnion bearings are positioned within the housings by springs engaging opposite ends of the drive shaft. After a period of use, excessive wear develops on the bearing surfaces of the housings. Normally it is then necessary to replace the universal joints. However, disposed immediately adjacent the worn areas of the bearing surfaces of the housings are additional areas which may also function as bearing surfaces for the trunnion bearings. It is therefore the primary object of this invention to provide a repair unit for universal joints of drive shafts, the repair units being of such a nature whereby the trunnion bearings at the opposite ends of the drive shaft may be shifted with respect to their respective housings.

Another object of this invention is to provide an improved repair unit for universal joints of drive shafts of automobiles, the repair unit being in the form of a pair of springs which are replacement springs for the original springs, the replacement springs including a short spring and a long spring, the combined lengths of the two springs being equal to that of the original springs whereby when the replacement springs are positioned within the universal joint housings in lieu of the original springs, the drive shaft and the trunnion bearings thereof are shifted longitudinally with respect to the housings of the universal joints so that the trunnion bearings engage new areas of the bearing surface of the housings.

A further object of this invention is to provide an improved repair unit for universals of a vehicle drive shaft, the repair unit including a pair of replacement springs, the springs being interchangeable and one of the springs being longer than the original spring which it replaces, the other of the springs being shorter than the original spring which it replaces, the combined lengths of the replacement springs being identical to the combined lengths of the original springs whereby the replacement springs may be first placed in universal joint housings to longitudinally shift the drive shaft and trunnion bearings in one direction from their original positions to engage first the areas of the bearing surfaces of the universal joint housings, and after the new areas have become worn, the replacement springs may be reversed so that the trunnion bearings will engage additional new areas of the bearing surfaces of the universal joint housings whereby the life of existing universal joints is tripled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a drive shaft of an automobile which has mounted on opposite ends thereof universal joints, the universal joints having the housings thereof broken away and shown in section in order to clearly illustrate the relationship between trunnion bearings carried by opposite ends of the drive shaft and the bearing surfaces on the interior of the universal joint housings;

Figure 2 is a transverse sectional view taken substantially upon the plane indicated by the section line 2—2 of Figure 1 and shows the details of one of the replacement springs; and Figure 3 is a transverse sectional view taken substantially upon the plane indicated by the section line 3—3 of Figure 1 and shows the details of the drive connection between components of one of the universal joints.

Referring now to the drawings in detail, it will be seen that there is illustrated in Figure 1 a drive shaft 10. The drive shaft 10 is an example of one of the many drive shafts which are now in common use. The drive shaft 10 has mounted on opposite ends thereof universal joints 12 and 14, the universal joints 12 and 14 being identical and being of the Detroit type.

The universal joint 12 includes a housing 16 which is provided at one end thereof with a coupling plate 18. The opposite end of the housing 16 is in the form of a collar 20 which surrounds the drive shaft 10 and which has removably secured thereto a boot 22 to seal the housing 16.

Carried by the end of the drive shaft 10 disposed within the housing 16 is a plurality of trunnion bearings 24. The trunnion bearings 24 engage a bearing surface 26 formed on the interior of the housing 16 and permit relative rocking movement between the drive shaft and the housing 16 whereby the necessary universal action is provided.

The universal joint 14, like the universal joint 12 includes a housing 28 which has connected to one end thereof a connection flange 30. The opposite end of the housing 28 is in the form of a collar 32 receiving an end portion of the drive shaft 10. The collar 32 is provided with a boot 34.

The inner surface of the housing 28 is in the form of a bearing surface 36. Engaged with the bearing surface 36 are trunnion bearings 38 carried by the respective ends of the drive shaft 10. The trunnion bearings 38 provide the universal action required between the housing 28 and the drive shaft 20.

In order that the trunnion bearings 24 and 38 may normally be centered within their respective housings 16 and 28, there are normally provided springs (not shown) which are positioned between the ends of the drive shaft 10 and the mounting plates 18 and 30. These springs are identical and normally center the trunnion bearings 24 and 38 with respect to the bearing surfaces 26 and 36, respectively. The normal points of engagement of the trunnion bearing 24 with the bearing surface 26 is indicated by the line 40. The normal point of engagement of the bearing surface 36 by the trunnion bearing 38 is indicated by the line 42. However, after the drive shaft 10 and the universal joints 12 and 14 have been used a considerable period of time, the bearing surfaces 26 and 36 begin to wear in the vicinity of the lines 40 and 42, respectively, and a loose fit between the trunnion bearings 24 and 38 and the universal joint housings 16 and 28, respectively occur.

Normally when wear occurs on the bearing housings 16 and 28, the universal joints 12 and 14 are replaced. However, the bearing surfaces 26 and 36 are of such a length whereby additional bearing areas are disposed on opposite sides of the original bearing areas whose centers are defined by the lines 40 and 42. Thus if the trunnion bearings 24 and 38 are shifted, they will engage other areas of the bearing surfaces 26 and 36, respectively, and eliminate the necessity of replacing the universal joints 12 and 14. It has been found that by substituting for the original springs replacement springs 44 and 46, this can be accomplished. The replacement spring 44 is identical to the original spring which it replaces with the exception that it is longer than the original spring. The replacement spring 46 is identical with the original spring which it replaces with the exception that it is shorter than the original spring. The combined lengths of the replacement springs 44 and 46 are identical to the combined lengths of the original springs. Thus the replacement of the original springs 44 and 46 in no way affect the operation of the drive shaft and the universal joints 12 and 14 with the exception that the drive shaft 10 and the trunnion bearings 24 and 38 are shifted longitudinally slightly with respect to the housings 16 and 28, respectively. The spring 44 is retained relative to the drive shaft 40 by means of a reduced pin 48 on the respective ends thereof. The spring 46 is positioned by means of a similar pin 50 on the opposite end of the drive shaft 10. It is to be noted that when the spring 44 is disposed within the housing 16 and the spring 46 is disposed within the housing 28, the trunnion bearings 24 engage the bearing surface 26 along areas whose centers are defined by the line 52 whereas the trunnion bearings 38 engage new areas of the bearing surface 36 along the line 54. In other words, the trunnion bearings 24 and 38, together with the drive shaft 10 are bodily shifted to the right, as viewed in Figure 1.

After the new areas of the bearing surfaces 26 and 36 have been used a period of time, they will also begin to show wear. In lieu of then replacing the universal joints 12 and 14, it is merely necessary to reverse the positions of the springs 44 and 46. This will move the drive shaft 10 and the trunnion bearings 24 and 38 to the opposite sides of the original areas of the bearing surfaces 26 and 36 as defined by the lines 40 and 42, respectively. The trunnion bearings 24 will engage the bearing surface 26 along new areas whose centers are defined by the line 56. At the same time the trunnion bearings 38 will engage new areas of the bearing surface 36, the new areas being defined by the line 58.

From the foregoing, it will be seen that there has been provided a very simple repair unit for universal joints of a drive shaft, the repair unit being in the form of a pair of replacement springs which will replace the original springs of the universal joints and which will so shift the trunnion bearings of the universal joints with respect to their bearing surfaces whereby two new areas of the bearing surfaces will be utilized and thus the life of the universal joints tripled.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Adjusting means for universal joints at opposite ends of a drive shaft, said adjusting means comprising a pair of replacement shaft positioning springs, said springs being of the same types as the original universal joint springs with one of said springs being shorter than the original springs and the other of said springs being longer than the original springs whereby the position of the drive shaft relative to coupling housings at opposite ends thereof is shifted to present new bearing surfaces on the coupling housings.

2. Adjusting means for universal joints at opposite ends of a drive shaft, said adjusting means comprising a pair of replacement shaft positioning springs, said springs being of the same types as the original universal joint springs with one of said springs being shorter than the original springs and the other of said springs being longer than the original springs whereby the position of the drive shaft relative to coupling housings at opposite ends thereof is shifted to present new bearing surfaces on the coupling housings, the combined lengths of said replacement springs being equal to the combined lengths of the original springs.

3. An adjusted drive shaft and universal joint assembly comprising a drive shaft and universal joints at opposite ends of said drive shaft, each of said universal joints including a housing having an internal bearing surface, trunnion bearings on the respective end of said drive shaft, said trunnion bearings being disposed within said housing and engaging said bearing surfaces, a replacement spring disposed in each housing, said springs being disposed in opposed relation and having first ends engaging opposite ends of said drive shaft and second ends engaging ends of said housings to position said drive shaft and said trunnion bearings relative to said housings, one of said springs being shorter than an original spring, the other of said springs being longer than an original spring whereby said trunnion bearings engage new areas of said bearing surfaces.

4. An adjusted drive shaft and universal joint assembly comprising a drive shaft and universal joints at opposite ends of said drive shaft, each of said universal joints including a housing having an internal bearing surface, trunnion bearings on the respective end of said drive shaft, said trunnion bearings being disposed within said housing and engaging said bearing surfaces, a replacement spring disposed in each housing, said springs being disposed in opposed relation and having first ends engaging opposite ends of said drive shaft and second ends engaging ends of said housings to position said drive shaft and said trunnion bearings relative to said housings, one of said springs being shorter than an original spring, the other of said springs being longer than an original spring whereby said trunnion bearings engage new areas of said bearing surfaces, the combined lengths of said replacement springs being equal to the combined lengths of the original springs.

5. An adjusted drive shaft and universal joint assembly comprising a drive shaft and universal joints at opposite ends of said drive shaft, each of said universal joints including a housing having an internal bearing surface, trunnion bearings on the respective end of said drive shaft, said trunnion bearings being disposed within said housing and engaging said bearing surfaces, a replacement spring disposed in each housing, said springs being disposed in opposed relation and having first ends engaging opposite ends of said drive shaft and second ends engaging ends of said housings to position said drive shaft and said trunnion bearings relative to said housings, one of said springs being shorter than an original spring, the other of said springs being longer than an original spring whereby said trunnion bearings engage new areas of said bearing surfaces, said replacement springs being interchangeable to again shift and drive shafts and trunnion bearings whereby said trunnion bearings engage other new areas of said bearing surfaces.

6. An adjusted drive shaft and universal joint assembly comprising a drive shaft and universal joints at opposite ends of said drive shaft, each of said universal joints including a housing having an internal bearing surface, trunnion bearings on the respective end of said drive shaft, said trunnion bearings being disposed within said housing and engaging said bearing surfaces, a replacement spring disposed in each housing, said springs being disposed in opposed relation and having first ends engaging opposite ends of said drive shaft and second ends engaging ends of said housings to position said drive shaft and said trunnion bearings relative to said housings, one of said springs being shorter than an original spring, the other of said springs being longer than an original spring whereby said trunnion bearings engage new areas of said bearing surface, said replacement springs being interchangeable to again shift said drive shafts and trunnion bearings whereby said trunnion bearings engage other new areas of said bearing surfaces, the combined lengths of said replacement springs being equal to the combined lengths of the original springs.

References Cited in the file of this patent

UNITED STATES PATENTS

| | | |
|---|---|---|
| 990,627 | Bogart | Apr. 25, 1911 |
| 1,508,653 | Flick | Sept. 16, 1924 |
| 1,921,274 | Warner | Aug. 8, 1933 |
| 2,477,449 | Godsey | July 26, 1949 |